United States Patent Office 3,698,873
Patented Oct. 17, 1972

3,698,873
ROTARY AFTERBURNER FOR INTERNAL COMBUSTION ENGINES
Takashi Kohayakawa, Shinichi Yamamoto, and Michio Morimoto, Osaka, Japan, assignors to Daihatsu Kogyo Co., Ltd., Osaka, Japan
Filed Jan. 25, 1971, Ser. No. 109,506
Claims priority, application Japan, Jan. 31, 1970, 45/9,873
Int. Cl. F01n 3/14
U.S. Cl. 23—277 C
5 Claims

ABSTRACT OF THE DISCLOSURE

A rotary afterburner for internal combustion engines includes a rotary heat exchanger in the form of a honeycomb matrix located within a combustion chamber into which exhaust gases from the engine exhaust manifold are introduced after passing through one section of the rotating heat exchanger. The exhaust gases are burned in the combustion chamber and thence are passed through another section of the rotating heat exchanger and finally exhausted to atmosphere through an exhaust pipe.

---

The present invention relates to afterburners for the exhaust gases of an internal combustion engine whereby the noxious gases contained in the exhaust gases, such as carbon monoxide, nitrogen oxides and others are converted by burning to relatively harmless gases before being vented to the atmosphere so that pollution by the exhaust gases is substantially reduced. In addition, the afterburner of the present invention operates continuously and efficiently and can be readily serviced. The afterburner also serves to reduce the noise level usually emitted by exhaust gases as they leave the exhaust pipe. The afterburner of the present invention includes a rotating heat exchanger which may be driven by a means which can also be employed for impelling a coolant such as air to the afterburner for cooling the combsution chamber of the burner. To increase the efficiency of the afterburner, one may mix at least some of the air coolant, after it has been heated by the heat of combustion of the exhaust gases with fresh exhaust gases being introduced into the afterburner so as to improve combustion of said gases.

The above and other objects and advantages of the present invention will be more readily apparent from the following description of the accompanying drawings in which.

Figure 1:
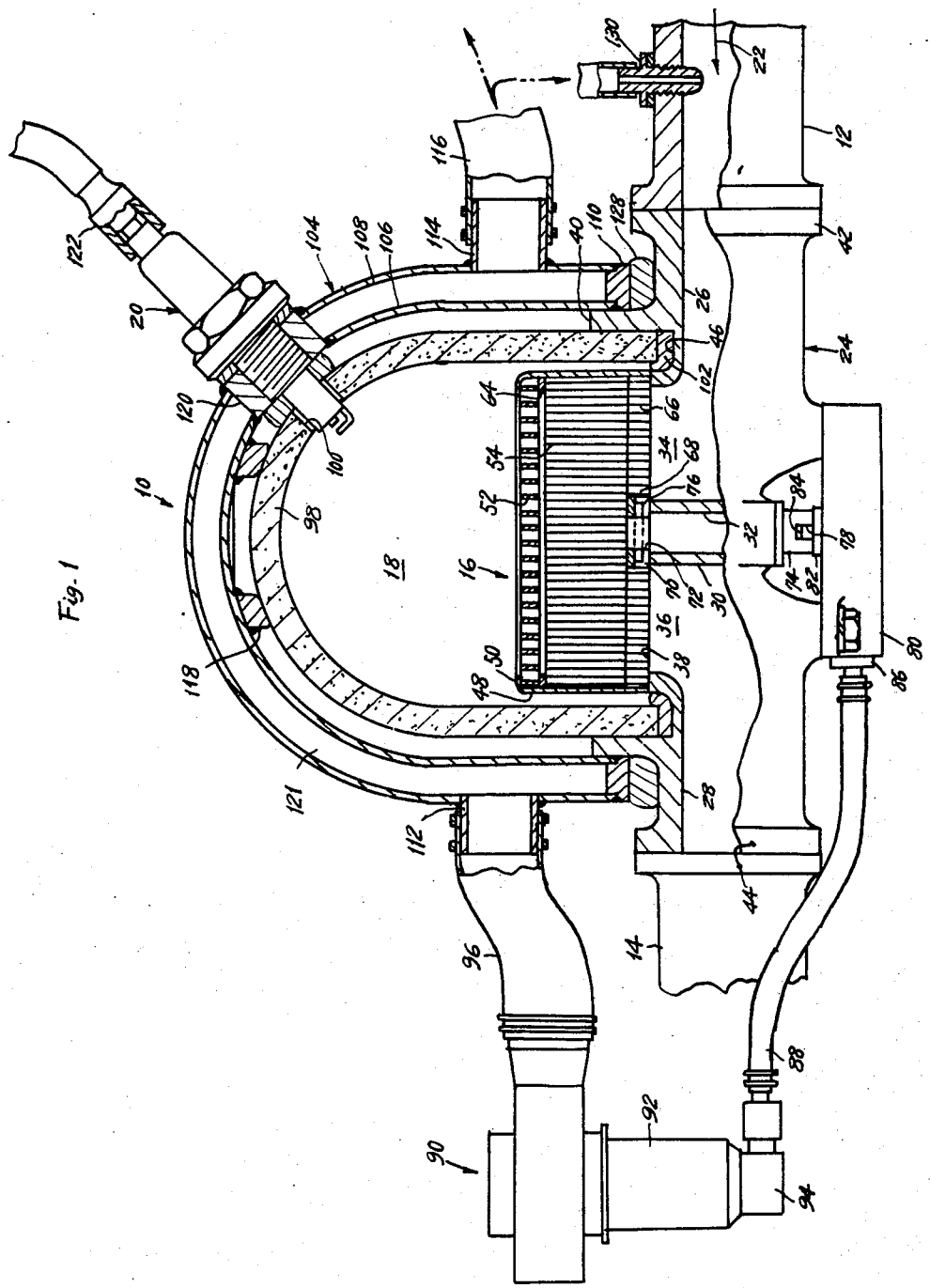
FIG. 1 is an elevational view, partly in cross section of the afterburner.

According to FIG. 1 exhaust gases from an internal combustion engine, such as an automobile engine, not shown, are passed through the exhaust manifold 12 in the direction of arrow 22 into the rotary afterburner 10. After passing through the afterburner, the gases pass into an exhaust pipe 14 and thence ultimately to the atmosphere. The afterburner includes a combustion chamber 18 and a rotary heat exchanger 16, to be described in detail below. An ignition device such as spark plug 20 mounted in opening 100 in the combustion chamber for igniting the gases as they pass through the afterburner. The gases, after burning in the combustion chamber 18, leave the afterburner and pass through the heat exchanger element 16 and impart heat to it, which heat is used to preheat the incoming unburned gases as noted below. After leaving the heat exchanger 16 the gases pass into the exhaust pipe 14.

The afterburner 10 includes a lower casing member 24 which is provided with an inlet 26 and flange 42 for connection to the exhaust manifold 12 for receiving the incoming gases and an outlet 28 and flange 44 for connection to the exhaust pipe 14. A transverse wall 30 extends across the casing 24 to provide in the central space in the lower casing two substantially semicircular ports 34 and 36. Port 34 is an inlet port for admitting the gases from the inlet 26 to the heat exchanger 16 whereas port 36 is an outlet port for admitting the burned gases from the heat exchanger 16 to the outlet 28. The casing 24 is provided with a smooth bearing surface 38 for receiving the heat exchanger 16 and permits rotation thereof about a vertical axis as described hereinafter.

The heat exchanger 16 is composed of a ceramic honeycomb matrix 52 mounted on top of and spaced from a second honeycomb matrix 54, which is, in turn mounted on a matrix 66 made of stainless steel, for example. The matrix 66 rotates on the bearing surface 38. The matrices 52, 54 and 66 are mounted together and held in place by a circular casing 48 made preferably of stainless steel and having an inwardly turned circular flange 50. A spacing ring 64 is porvided between the matrix 52 and matrix 54 for purposes to be described below. The matrices are pressed into the casing 48 under high temperature and are secured together in the desired relationship.

The wall 30 is provided with a journal 32 which houses a rotatable shaft 74 which in turn is secured to a hub ring 68 mounted at the center of the bottom of the lower martix 66. The shaft 74 and the hub ring 68 may be secured together, for instance, by a drive pin 76 which engages slot 70 in the hub ring 68. The bottom of shaft 74 is provided with a slot 78 for engaging a tongue 84 driven by an output shaft 82 connected to a reduction gear 80. The reduction gear is driven by a drive cable 88 connected to an electric motor 92 through a gear 94. Thus the electric motor 92 rotates the heat exchanger 16 about a vertical axis.

As mentioned above gases entering through semicircular inlet port 34 pass through the honeycomb matrices which have been heated, and thus the gases are heated for more efficient burning in the combustion chamber and the burned gases furnish heat to the matrices as they leave the combustion chamber 18 for subsequently heating fresh incoming gases after rotating about the vertical axis.

A blower fan 90 may be driven by the electric motor 92 for supplying cooling air through duct 96 to the outside of the combustion chamber 18. As seen in FIG. 1, the combustion chamber has a ceramic dome-shaped element 98 surrounding it and the element is mounted in an annular recess 46 of the casing 24. An asbestine cushion ring 102 may be provided for sealing the combustion chamber. Inner and outer casings 106 and 108 form an upper housing 104 which is preferably made of stainless steel, and is mounted over the ceramic element 98 so that the casings 106 and 108 are spaced from each other and housing 104 is spaced from the element 98. The duct 96 admits air through inlet 112 to the space 121 between the inner and outer casings 106 and 108 to cool not only the element 98 but also the sparkplug 20. The heated air is removed from the space 121 through outlet 114, which is connected to a duct 116 for supplying the heated air, if desired, to the vehicle for heating purposes. Also, if desired, a portion of the heated air in duct 116 may be passed to an inlet nozzle 130 disposed in exhaust manifold 12 for supplying additional heated air to the exhaust gases to be burned in the afterburner, thus improving the efficiency of such burning.

Figure 2:
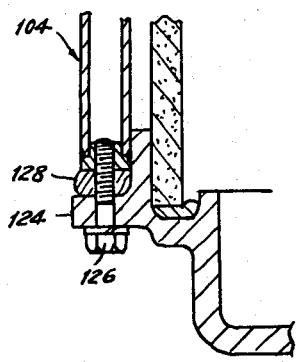
FIG. 2 is a cross-sectional view of a portion of FIG. 1 showing a modified arrangement for mounting the combustion chamber.

The spaced casings 106 and 108 are secured together in spaced relation as by welding to a ring 110 which is designed to fit around a cylindrical guide 40 provided on the casing 24 and may be seated on an asbestine cushion ring 128. The guide 40 also locates the position of the ceramic element 98 about the rotatable heat exchanger 16. The ceramic element 98 may be seated in an asbestine cushion ring 102 in the annular recess 46 also provided in the casing 24. If desired the ring 110 may be secured to a flange 124 as by bolt 126, as shown in FIG. 2. In order to assure the proper spacing of the housing 104 a spacer ring 118 preferably of stainless steel may be secured to the inner surface of the inner casing 106 so as to rest on the outer upper surface of element 98.

Figure 4:
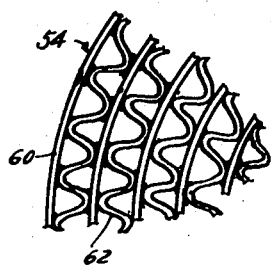
FIGS. 3, 4 and 5 show in plan view different forms of heat exchanger elements which may be used in the present afterburner.
Figure 5:
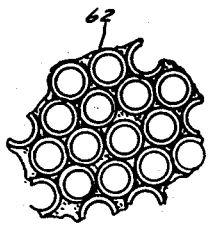
Figure 3:
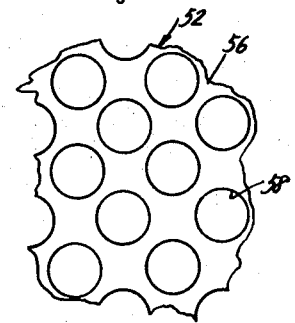

As stated hereinbefore, the matrices 52 and 54 may be made of ceramic material. Matrix 52, as shown in FIG. 3 may consist of a plate 56 of ceramic material approximately 10 mm. in thickness provided with holes 58 approximately 10 mm. in diameter. As shown in FIG. 4, matrix 54 may be formed of cylindrical concentric plates 60 and corrugated plates 62 therebetween and extending about the concentric cylindrical plates 60, the two plates being secured together by a ceramic cement. This matrix may be made by forming the desired shape from porous soft paper, dipping the paper matrix into a liquid ceramic and then baking at a high temperature. If desired the ceramic matrices may be formed by embedding ceramic pipes 62 of the desired length in ceramic material as shown in FIG. 5.

During operation, the heat exchanger 16 is driven at a speed of from about 20 to about 40 r.p.m and the exhaust gases are passed upwardly through the exchanger 16 to be heated thereby. When the gases pass from matrix 54 to the larger openings in matrix 52 they are intermixed within the space provided between the matrices by the spacer ring 64 as noted above and are decelerated so that when the gases enter the combustion chamber for ignition by the sparkplug 20 the flame is maintained near the upper surface of the heat exchanger so that it is possible to maintain a continuous burning. The burned gases then pass through the matrices on the opposite side of the exchanger for heating the ceramic material as noted above.

We claim:

1. An afterburner for noxious exhaust gases from an internal combustion engine comprising a ceramic lined combustion chamber, a ceramic rotary heat exchanger element mounted in one end of said combustion chamber, means for rotating said heat exchanger element about its axis, said heat exchanger element having a plurality of passages therethrough parallel to the axis of the heat exchanger element and communicating at their inner ends with said combustion chamber, inlet means for introducing exhaust gases into the outer ends of a first portion of the plurality of passages for passage therethrough into said combustion chamber, means for igniting the exhaust gases in said combustion chamber to cause burning thereof to form substantially harmless gases, said heat exchanger element including means for decelerating said exhaust gases as they enter said combustion chamber whereby the flame of the burning gases is maintained adjacent the inner surface of said heat exchanger element, outlet means for withdrawing burned gases from said combustion chamber through a second portion of the plurality of passages opposed to the first portion of the passages, whereby the burned gases, when being withdrawn from said combustion chamber, supply heat to the second portion of the passages of the heat exchanger element, which, after rotation, supplies heat to the exhaust gases introduced into the heated passages to facilitate subsequent burning thereof.

2. An afterburner as claimed in claim 1 wherein said rotary heater exchanger element includes an upper and a lower member in superposed spaced relationship, each of said members having a plurality of passages therethrough, the passages in said upper member having a greater cross-sectional area than the cross-sectional area of the passages in said lower member.

3. An afterburner as claimed in claim 1 and further comprising a pair of spaced housing elements substantially surrounding and spaced from said combustion chamber and means for introducing and withdrawing a coolant into and from the space between said elements for cooling said combustion chamber.

4. An afterburner as claimed in claim 3 and further comprising means for propelling the coolant into the space between said housing elements, and wherein the means for rotating said heat exchanger element serves to actuate said propelling means.

5. An afterburner as claimed in claim 3 wherein the coolant is air and further comprising means for introducing at least a portion of the heated air withdrawn from the space between said housing elements to the exhaust gases before said gases are introduced through said inlet means.

References Cited

UNITED STATES PATENTS

| 3,166,118 | 1/1965 | Koch | 165—9 |
| 3,172,251 | 3/1965 | Johnson | 60—29 A |
| 3,201,933 | 8/1965 | Baden | 60—30 R |
| 3,211,534 | 10/1965 | Ridgway | 60—30 R |
| 3,248,872 | 5/1966 | Morrell | 60—30 R |
| 3,531,930 | 10/1970 | Foster-Pegg | 60—29 A |

DOUGLAS HART, Primary Examiner

U.S. Cl. X.R.

60—282, 298, 902